R. A. WEAGANT AND F. N. WATERMAN.
RADIOSIGNALING APPARATUS.
APPLICATION FILED JULY 12, 1918.

1,356,752.

Patented Oct. 26, 1920.
5 SHEETS—SHEET 1.

Inventors
Roy Alexander Weagant
and Frank N. Waterman
By their Attorney
Herbert G. Ogden

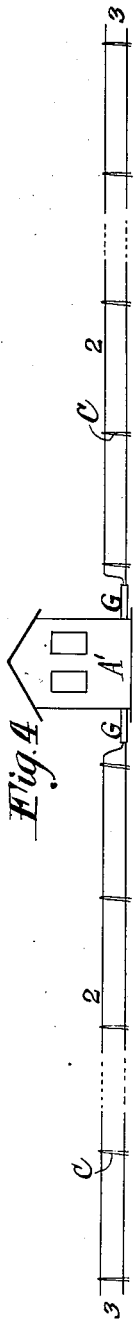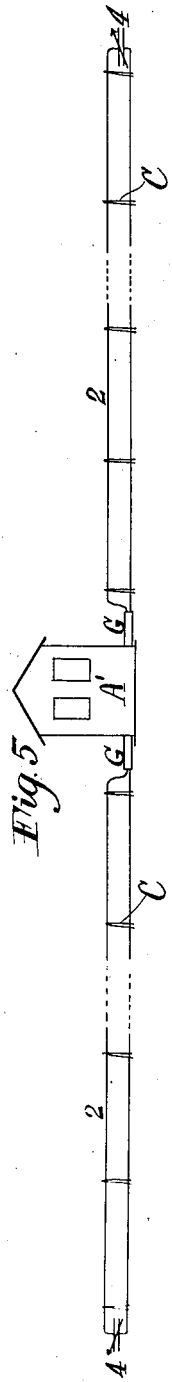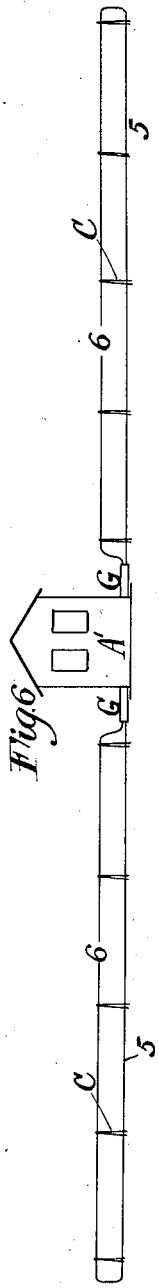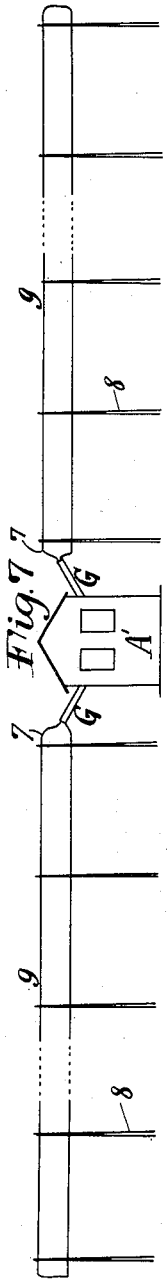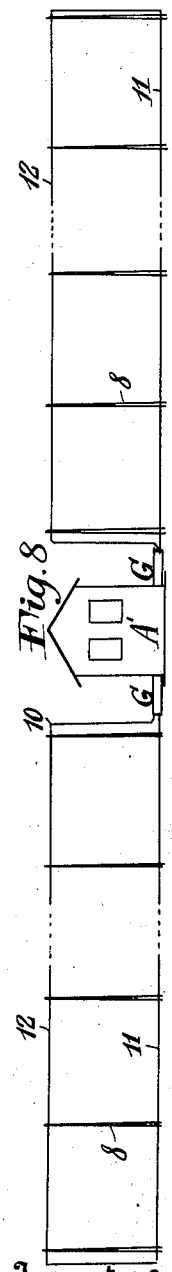

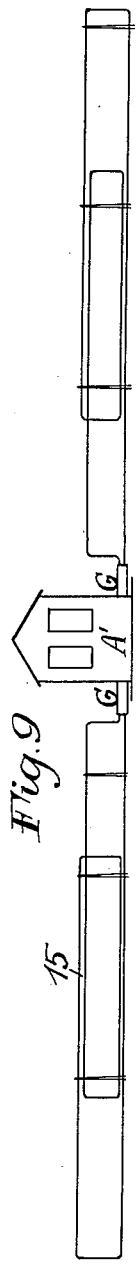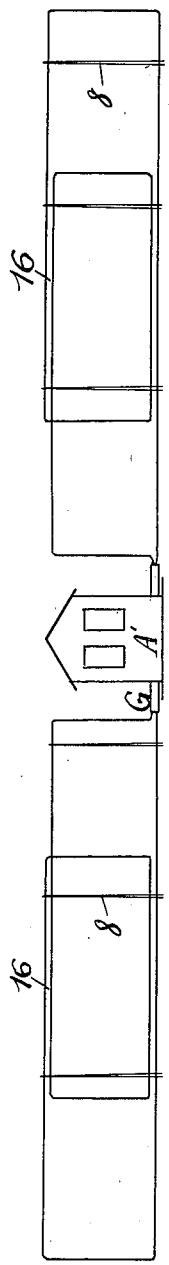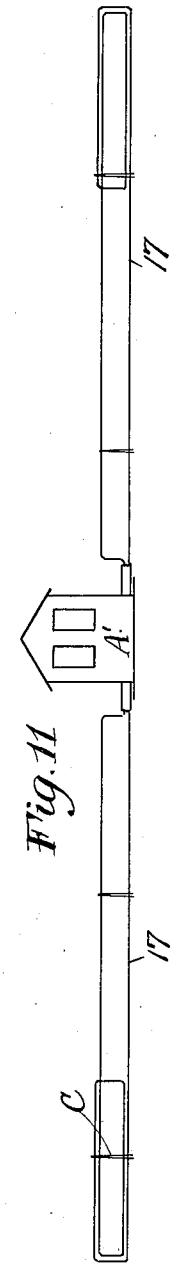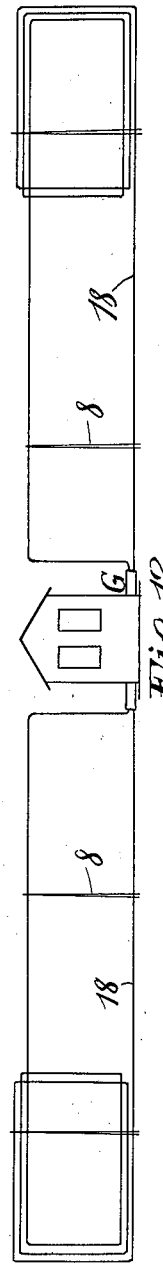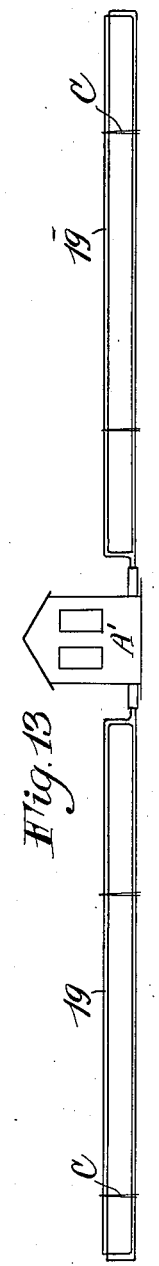

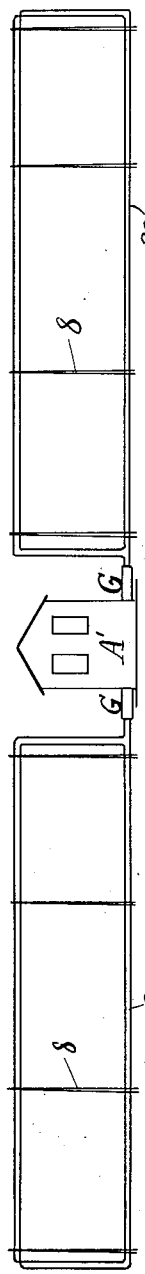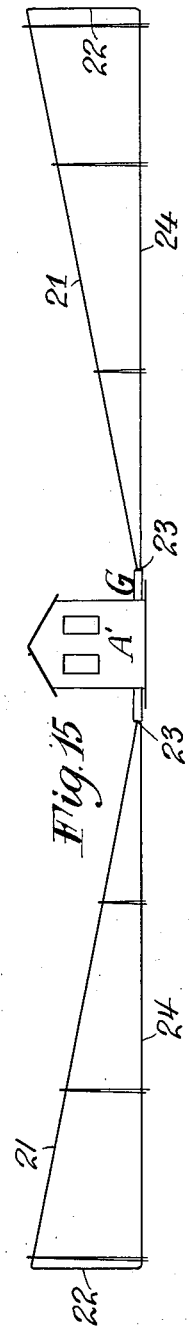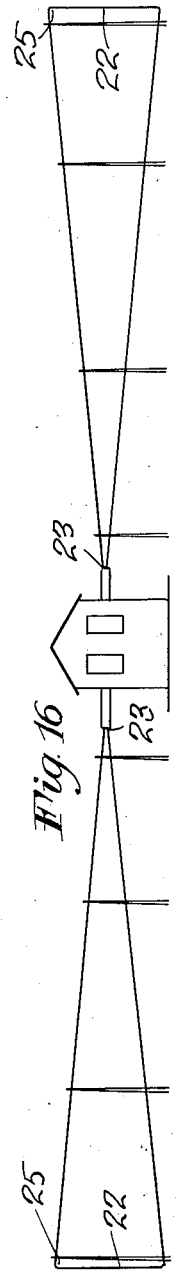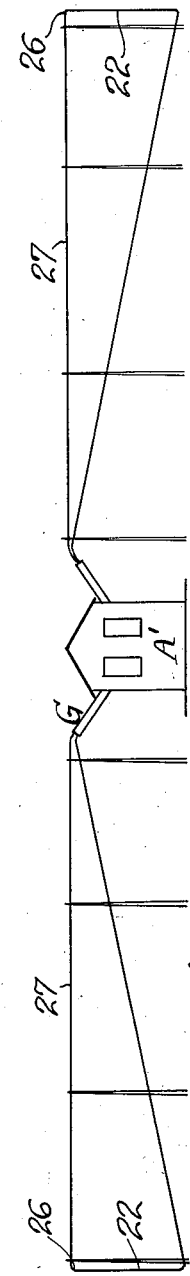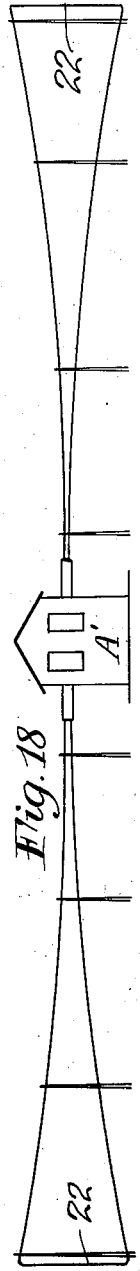

UNITED STATES PATENT OFFICE.

ROY ALEXANDER WEAGANT, OF NEW YORK, N. Y., AND FRANK N. WATERMAN, OF SUMMIT, NEW JERSEY, ASSIGNORS, BY MESNE ASSIGNMENTS, TO RADIO CORPORATION OF AMERICA, A CORPORATION OF DELAWARE.

RADIOSIGNALING APPARATUS.

1,356,752.   Specification of Letters Patent.   Patented Oct. 26, 1920.

Application filed July 12, 1918. Serial No. 244,563.

*To all whom it may concern:*

Be it known that we, ROY ALEXANDER WEAGANT and FRANK N. WATERMAN, citizens of the United States, and residents of Douglas Manor, county of Queens, city and State of New York, and Summit, county of Union, State of New Jersey, have invented certain new and useful Improvements in Radiosignaling Apparatus, of which the following is a specification accompanied by drawings.

This invention relates to radio signaling apparatus, but more particularly to receiving apparatus employing a plurality of antennæ in which the effects of static disturbances are balanced out at the receiving station while the signals are retained in accordance with the discoveries of Roy A. Weagant and the methods and apparatus based thereon disclosed in his co-pending applications Serial Nos. 157,594 and 181,458.

In the applications referred to are disclosed loop antennæ in the form of cages separated by an appreciable fraction of a wave length and connected by long leads to the central receiving apparatus. In practical reception, especially with very long wave lengths, these long leads are found to introduce certain difficulties, most of which are successfully overcome by the apparatus disclosed in R. A. Weagant's co-pending application, Serial No. 244,562 which includes adjusting and tuning means at the loops or cages as well as at the receiving station.

Use of the loop and lead antenna systems, while admirably operative, is inconvenient and has indicated that much of the inconvenience probably lies in the fact that the leads posses distributed inductance and capacity while the antenna loops or cages act as localized inductances of large magnitude and as local energy gatherers. Whether this is a correct explanation of the cause of the phenomena oberved in connection with the leads and loops, cannot be stated with certainty at present, and future investigation may reveal more in regard to the complicated nature of the propagation of the oscillations in the leads.

The primary object of the present invention is to do away with the long leads and devise means for operating in accordance with R. A. Weagant's basic discoveries, which will obviate the inconveniences due to the leads.

We have discovered that the inconveniences herein referred to may be largely avoided by means of antennæ which, of themselves, are so constructed as to have substantially uniformly distributed or graded constants, thereby making it possible to either avoid reflection points altogether or to arbitrarily introduce them at will and at selected or experimentally determined positions, or at calculated positions. We have found that antennæ in the form of greatly elongated loops of any desired vertical height extending substantially horizontally in opposite directions from the station in the general line of transmission and having their planes substantially vertical, avoid many of the inconveniences due to the use of long leads. These loops, which may be of different forms, should preferably be constructed so as to have substantially uniformly distributed or smoothly graded constants, thus avoiding reflection points, and the loops may have a single turn or have a plurality of turns arranged in various forms.

In accordance with our present invention, the signal energy collected by the antennæ is rendered available in the station for the purpose of detection and utilization, and another important advantage of this invention resides in the fact that all of the adjusting and tuning may be completely controlled by means of adjustable elements located at one point; that is, at the central receiving station itself, where the receiving apparatus is located, and this has been found to be true, even with an effective antenna separation as great as one-half wave length for very long waves, many thousands of meters long. By effective separation in this instance, we mean the distance between the centers of the loops, for the loops must terminate at a distance farther away from the station than in the case of cage antennæ for the effective separation, but in the case of the loops, no operators are needed at the far ends.

We have found that with antennæ in the form of loops substantially as herein described, and illustrated in the accompanying drawings in some of their forms as used by us we are enabled to balance out the static and retain the signals in accordance with the discoveries and basic principles of operation disclosed in the co-pending applications, Serial Nos. 157,594 and 181,458 referred to. In the drawings—

Figs. 4 to 8 inclusive are diagrammatic representations of modified forms of elongated single turn loop antennæ.

Figs. 9 to 14 inclusive are similar views of modifications of elongated loop antennæ having a plurality of variously arranged turns; and Figs. 15 to 18 inclusive are similar views of modifications showing generally triangular forms of loops having graded constants.

Figure 1:
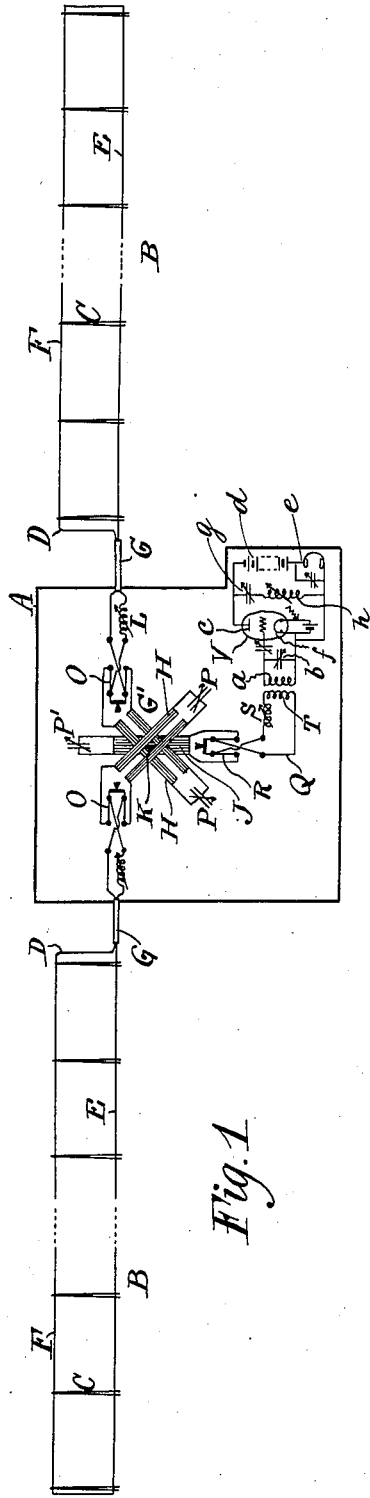
Figure 1 is a diagrammatic representation of circuits and apparatus embodying the invention in which two greatly elongated, horizontally extending loop antennæ are shown.

Referring to the drawings, and more particularly to Fig. 1, the outline represented at A indicates a receiving station or receiving house in which the receiving apparatus is located. A plurality of antennæ B, in this instance a pair of antennæ, in the form of elongated loops, which may be of any desired dimensions, are shown extending substantially horizontally in opposite directions from the station A. These elongated loops are shown with dotted portions in their length to indicate that the loops are very much longer, in proportion, than represented owing to the limits of the sheet on which they are drawn. The loops preferably extend in the same, or substantially parallel, planes in the general direction of reception and the wires forming the loops may be conveniently supported in any suitable manner on stakes or poles, depending upon the dimensions of the loops. In Fig. 1 for instance, stakes C approximately four feet in length are indicated, and the loops are approximately three and one-half feet in vertical height or width. The vertical dimensions of the loops are thus relatively small compared to their length, which should be equal to an appreciable fraction of the wave length of the signal waves to be received. We have constructed such loops each with a length of over 9000 feet, making the total length between the outer ends of the loops something over 18,000 feet, so that the effective separation of the loops measuring from the centers, is approximately a half wave length for a 6000 meter wave.

The loops, as shown in Fig. 1, may consist of wire or other suitable conductors D strung or suitably fastened to, but preferably insulated from the stakes C. In the form of the invention shown in Fig. 1 it is to be understood that the lower length or wire E of each loop is supported near the ground while the upper length or wire F is preferably located substantially vertically over the wire E.

The inner ends of the loops as shown are preferably brought into the receiving station by means of short leads of lead sheathed cable G which may be from 50 to 100 feet in length so that the length of the leads is trivial compared to the length of the loops. These short lengths of lead cable seem to have a beneficial effect in reducing the electro-magnetic or electrostatic coupling between the loops and the receiving apparatus.

At the receiving station or house A we provide any suitable form of receiving apparatus for balancing out the static while retaining the signals and for illustrative purposes we have shown a goniometer G' having the stationary coils H and the movable coil J pivoted at K, although we are not to be understood as limiting ourselves to a goniometer, for various forms of receiving apparatus or coupled circuits may be provided. A goniometer is however found to be a suitable and convenient instrument for our purposes.

The wires from the cables G as shown are connected to the stationary coils H of the goniometer through the reversing switches O because it has been found that there is apparently a best relation between the leads and the receiving apparatus, and it is desirable to be able to reverse the connections of the leads to the receiving apparatus as desired. The leads are provided with the tuning inductances L, and variable condensers P are shown connected in series with the fixed goniometer coils H. A variable condenser P' is also shown in series with the movable goniometer coil J.

Suitable receiver circuits including a three-element vacuum valve V are shown coupled to the circuit Q, which is connected through reversing switch R, to the goniometer coil J, because it has been found that it is desirable to be able to control the connections between the receiver circuits and the goniometer. The circuit Q also preferably includes the loading inductance S and the coupling coil T. The valve V is connected to the oscillatory circuit $ab$ and the valve has, as shown, the usual plate circuit $c, d, e, f$, and in addition the oscillatory circuit $c, g, h, f$, although any suitable or desirable circuits may be used.

By suitable adjustment of the apparatus the effects due to static disturbances neutralize and balance out, while the effects due to the signals combine to produce a resultant current in the receiving circuits.

The elongated loop antennæ, such as illustrated in Fig. 1, have their constants so uniformly distributed as to avoid natural reflection points, while permitting the arbitrary production of such points as desired, and we have found it highly desirable to introduce localized or lumped inductances for this purpose where the length of the individual loop is a considerable fraction of a wave length.

We have used approximately rectangular loops of substantially uniform dimensions, as shown in the drawings of this application, having substantially parallel wires, in lengths of from about 1000 feet to about 9200 feet, and with a vertical separation between the upper and lower wires EF varying from about one and one-half feet to about sixteen feet, and these loops have been arranged with varying elevations of the lower wire E from a point close to the ground up to about twelve feet from the ground, and all with good results. As far as our observations have gone, the best results appeared to be obtained with the wider separation of the wires E and F. Our observations also indicate that the lower wires or lengths E of the loops should not be so close to the ground as to give high damping. The actual vertical separation between the wires E and F may however be anything desired.

Since the effective separation of two such oppositely extended elongated antennæ is equal to the distance between their centers, each loop must be one-half wave length in length, in order to obtain a separation of a half wave length. The natural wave length of such an antenna is very great and to control effectively its mode of vibration and enable it to tune effectively below its natural period, we have found it desirable to introduce preferably fixed concentrated line inductances such as shown at U in Fig. 2.

Figure 2:
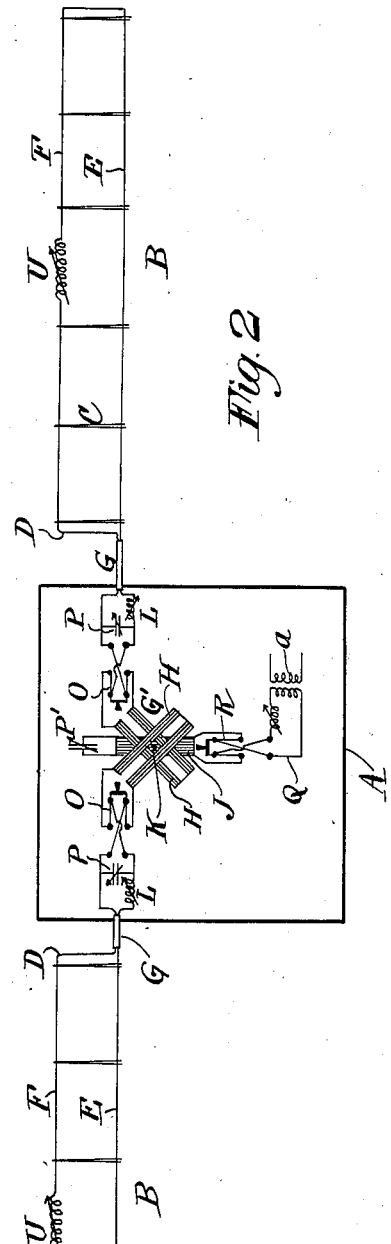
Fig. 2 is a modification of Fig. 1 in which line inductances are shown connected in the loops.

The antennæ shown in Fig. 2 are like those shown in Fig. 1 with the exception of the line inductances U. As an example, in an antenna of Fig. 2, having a length of approximately 3600 feet, we have found that a line inductance U of the order of 5 milli-henrys is advantageous for wave lengths between 2000 and 8000 meters, and in a loop approximately 9200 feet long, a value of inductance U of the order of 32 milli-henrys has proved effective. There appears to be substantially nothing critical about these values, however, although for each loop and wave length there is a most desirable order of magnitude for the line inductances.

These line inductances U do not appear to act as tuning elements in the ordinary sense, but rather seem to determine the mode of vibration of the loop and the location of the nodes and anti-nodes of current. The oscillation is apparently at multiples of the fundamental frequency and seemingly at even harmonics, but all attempts to find an exact analysis of the mode of vibration have thus far failed to give conclusive results.

In our tests thus far made the best results have been attained when the line inductance U was located at or near the middle of the top wire F of the loop, and a change of location from this middle point resulted in a reduction in the strength of a signal. Instead of the line inductances U, combinations of inductance and capacity may be used, or the wire may actually be opened (as in Figs. 4 and 6) and good results in eliminating static and preserving the signal may thus be attained.

As we have indicated, the function of the line inductance U in the top leg or wire of the loop is to enable the tuning to be accomplished. The reason for the location of the line inductance at a particular place in the length of the loop, which, however, is variable with other variations in the circuits, is to bring about a current distribution such that the tuning elements inserted in the station end of the loop may have proper effect.

With loop antennæ approximately a half-wave length long, we have found that the loops tune best with parallel tuning, that is, with the condensers P (Fig. 2) in parallel across the leads; and we have also found that the tuning inductances L under such conditions should be inserted as shown in Fig. 2 in the opposite leg of the loop from the line inductance U. With the exception of the location of the condensers P the circuits of the receiving apparatus in Fig. 2 are indicated the same as Fig. 1, although the receiver circuits are not indicated, for simplicity.

Figure 3:
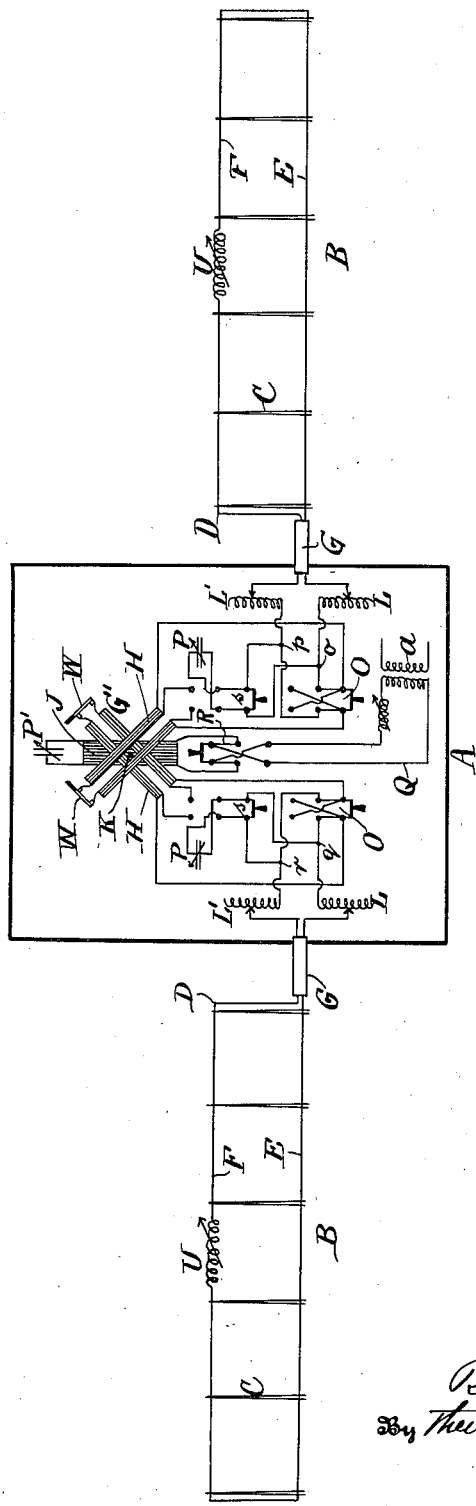
Fig. 3 is a view similar to Fig. 2 showing a modification of the circuits at the receiving station.

Fig. 3 shows diagrammatically circuits and apparatus at the receiving station for both series and parallel tuning. The goniometer coils H are provided with ordinary switches W shown in Fig. 3 in closed position because the condensers P are shown connected in parallel across the leads between the points $o$ $p$ and $q$ $r$ through the double throw switches $s$. When these switches $s$ are thrown to the opposite position, the condensers P will be connected in series with the goniometer coils H and then the knife switches W should be open. In Fig. 3, inductances L and L' are shown at the station in both leads from the loops and either or both of these inductances may be used as desired, depending upon the conditions. The leads are brought to the reversing switches O and from thence the circuits are connected to the goniometer coils H so that the relation of the leads to the receiving apparatus may be reversed as desired.

In Figs. 4 to 8 inclusive A' represents the receiving station or receiving house in which the receiving apparatus is located, it being understood that receiving apparatus substantially like that indicated in Fig. 3, for instance, will be used in the house. Figs. 4 to 8 inclusive illustrate different forms of loop antennæ which we have used.

In Fig. 4 the elongated loop antennæ 2 are open at the ends 3, it being understood that the antennæ are illustrated diagrammatically and may be of any suitable dimensions.

Instead of actually opening the loops, a condenser 4 may be inserted at each end, as in Fig. 5. In either the case of Fig. 4 or of Fig. 5 the antennæ appear to act as loops closed through the capacities of the wires to one another. They act as loops of indeterminate length, the effective length for a given actual length depending upon the separation of the wires.

In Fig. 6 the loop antennæ 5 are shown opened in the upper legs at the point 6, and these openings may be at any points desired instead of at the centers, as shown. With all of these forms of antennæ we have had good results in balancing out static and receiving signals.

In Fig. 7 the loops 7 are shown supported on high poles 8, about twenty feet high, the lower leg 9 of each loop being approximately twelve feet from the ground in the constructions with which we have actually worked.

In Fig. 8 the loops 10 are shown having a vertical separation of the lower and upper wires 11 and 12 of about sixteen feet, the lower wire 11 being near the ground. With both the forms of antennæ shown in Figs. 7 and 8 we have obtained perhaps our best results as compared with the other forms of antennæ shown in Figs. 1 to 7 inclusive, although we do not wish as yet to be understood as indicating that any one form is better than all others for all purposes in the present state of our knowledge.

Figs. 9 to 14 show different forms of loop antennæ, having a plurality of turns throughout the whole or a portion of their length. Fig. 9 illustrates a construction of elongated low loop antennæ in which a localized inductance 15 is purposely included by the construction of the loop itself and this may be located at any desired point in the length. Fig. 10 is like Fig. 9, except that the loop 16 is shown with a larger vertical dimension.

Figs. 11 and 12 show the loops 17 and 18 having the plurality of turns at their farther ends instead of at the middle.

Figs. 13 and 14 show low and high loops 19 and 20 formed of a plurality of turns throughout their length.

Figs. 15 to 18 show various forms of antennæ in general triangular in shape thus having graded constants, that is, graded capacity and inductance per foot of loop length. Constructions thus graded have the added advantage of giving greater effective separation than the loops with parallel sides for a given overall length. Thus to attain an effective separation of one-half wave length with any of the forms shown in Figs. 15 to 18, it seems only necessary to have a length for each antennæ of something less than the order of three-fourths the length required in the case of the parallel sided loops.

In Fig. 15 the loops 21 are in the form of right angled triangles having their bases 22 vertical and about twenty-eight feet high, although this height may be varied as desired and may be very much higher. The apex 23 of each loop is adjacent the station A' and the wires are preferably carried into the receiving house through the short lengths of lead cable G. Each loop 21 was about 3600 feet long in our actual work, although the length may be made anything desired. In Fig. 15 the lower wire 24 of each loop is shown substantially parallel to the ground and the loops are supported on suitable poles.

Fig. 16 shows the loops 25 in the form of isosceles triangles, while Fig. 17 shows the loops 26 having their upper wires 27 substantially parallel to the ground. In Fig. 18 the upper and lower wires of the loops are shown supported on the poles in such manner that the sides of the loops are in the form of curves instead of straight lines.

We claim and desire to obtain by Letters Patent, the following:

1. At a radio transmission receiving station, a plurality of antennæ extending substantially horizontally in opposite directions, the effective separation of said antennæ for the reception of signal waves being an appreciable fraction of a wave length, and receiving apparatus associated with said antennæ for utilizing the signal waves, including means for balancing out the currents due to static disturbances while retaining the signals.

2. At a radio transmission receiving station, a plurality of antennæ extending substantially horizontally in opposite directions, the effective separation of said antennæ for the reception of signal waves being an appreciable fraction of a wave length, means for tuning the antennæ to the incoming signal, and receiving apparatus for utilizing the signal waves, including means for balancing out the currents due to static disturbances while retaining the signals.

3. At a radio transmission receiving station, a plurality of elongated loop antennæ extending substantially horizontally in opposite directions, the effective separation of said antennæ for the reception of signal waves being an appreciable fraction of a wave length, means for tuning the antennæ to the incoming signal, and receiving apparatus for utilizing the signal waves, including means for balancing out the currents due to static disturbances while retaining the signals.

4. At a radio transmission receiving station, a plurality of loop antennæ extending from the receiving station in opposite directions in substantially the general direction of transmission and having a relatively small vertical dimension compared to a length equal to an appreciable fraction of the wave length of the signal waves to be received, and receiving apparatus for balancing out the static while retaining the signals.

5. At a radio transmission receiving station, a plurality of loop antennæ extending from the receiving station in opposite directions in substantially the general direction of transmission and having a relatively small vertical dimension compared to a length equal to an appreciable fraction of the wave length of the signal waves to be received, and receiving apparatus for balancing out the static while retaining the signals, said loops being connected to the receiving apparatus by means of leads substantially trivial in length as compared with the length of the loops.

6. At a radio transmission receiving station, a plurality of elongated loop antennæ extending substantially horizontally in opposite directions, receiving apparatus, and leads substantially trivial in length as compared to the length of the loops connecting said loops to the receiving apparatus.

7. At a radio transmission receiving station, a plurality of elongated loop antennæ extending substantially horizontally in opposite directions, said antennæ being free from natural reflection points, and receiving apparatus for utilizing the signal waves, including means for balancing out the static while retaining the signals.

8. At a radio transmission receiving station, a plurality of elongated loop antennæ extending substantially horizontally in opposite directions, said antennæ being free from natural reflection points, means for tuning the antennæ to the incoming signal, and receiving apparatus for utilizing the signal waves, including means for balancing out the static while retaining the signals.

9. At a radio transmission receiving station, a plurality of loop antennæ extending substantially horizontally in opposite directions from the station, said antennæ being free from natural reflection points, means for controlling the mode of vibration of said antennæ, and receiving apparatus for utilizing the signal waves, including means for eliminating the interference due to static disturbances.

10. At a radio transmission receiving station, a plurality of loop antennæ extending from the receiving station in opposite directions in substantially the general direction of transmission and having a relatively small vertical dimension compared to a length equal to an appreciable fraction of the wave length of the signal waves to be received, means for controlling the mode of vibration of said antennæ in response to received signals, and receiving apparatus for balancing out the static while retaining the signals.

11. At a radio transmission receiving station a pair of loop antennæ each having one terminus adjacent to the station, and the opposite terminus at an appreciable fraction of a wave length away from the station, and receiving apparatus at the station for balancing out static while retaining the signals.

12. At a radio transmission receiving station, two loop antennæ located in substantially the general direction of transmission, and receiving apparatus located between them, said antennæ being free from natural reflection points, means located in one length of each loop for controlling the mode of vibration of the loops, and tuning means at the station located in the other length of each loop.

13. At a radio transmission receiving station, two loop antennæ located in substantially the general direction of transmission, and receiving apparatus located between them, said antennæ being free from natural reflection points, means located in the top length of each loop for controlling the mode of vibration of the loops, and tuning means at the station located in the other length of each loop.

14. At a radio transmission receiving station, a plurality of loop antennæ extending substantially horizontally in opposite directions from the station, said antennæ being free from natural reflection points, means for controlling the mode of vibration of said antennæ, receiving apparatus for utilizing the signal waves, including means for eliminating the interference due to static disturbances, and means for tuning the antennæ to the incoming signal.

15. At a radio transmission receiving station, a plurality of loop antennæ extending from the receiving station in opposite directions in substantially the general direction of transmission and having a relatively small vertical dimension compared to a length equal to an appreciable fraction of the wave length of the signal waves to be received, receiving apparatus for balancing out the static while retaining the signals, and means for tuning the antennæ to the incoming signal.

16. At a radio transmission receiving station, two loop antennæ located in substantially the general direction of transmission, and receiving apparatus located between them, said antennæ being free from natural reflection points, means for controlling the mode of vibration of said loops, and means for tuning the antennæ to the incoming signal.

17. At a radio transmission receiving station, a plurality of elongated loop antennæ, each having a plurality of turns and extending substantially horizontally in opposite directions from the receiving station, receiving apparatus located between said loops, for utilizing the signal waves, including means for balancing out static while retaining the signals, and leads substantially trivial in length as compared to the length of the loops connecting said loops to the receiving apparatus.

18. At a radio transmission receiving station, a plurality of elongated loop antennæ, each having a plurality of turns throughout at least a portion of their length, said antennæ extending substantially horizontally in opposite directions from the receiving station, receiving apparatus located between said loops, for utilizing the signal waves, including means for balancing out static while retaining the signals, and leads substantially trivial in length as compared to the length of the loops connecting said loops to the receiving apparatus.

19. At a radio transmission receiving station, a comparatively low loop antenna extending horizontally, the area of which, per unit length measured horizontally, increases as a function of the distance from the station in the direction of propagation.

20. At a radio transmission receiving station, a low loop antenna extending horizontally having a length in a horizontal direction equal to an appreciable fraction of a wave length, the area of which loop per unit length increases as a function of the distance from the station.

21. At a radio transmission receiving station, a pair of loop antennæ extending substantially horizontally in opposite directions from the station, the area of each loop, per unit length, increasing as a function of the distance from the station.

22. At a radio transmission receiving station, a pair of loop antennæ extending substantially horizontally in opposite directions from the station, each loop having a length equal to an appreciable fraction of a wave length, the area of each loop, per unit length, increasing as a function of the distance from the station.

23. At a radio transmission receiving station, a pair of loop antennæ extending substantially horizontally in opposite directions in substantially vertical planes, the upper and lower sides of said loops diverging away from one another, receiving and tuning apparatus located between said loops and arranged to balance out impulses of like phase and to combine cumulatively impulses of different phase.

24. At a radio transmission receiving station, a pair of loop antennæ extending substantially horizontally in opposite directions in substantially vertical planes, the upper and lower sides of said loops diverging away from one another, and receiving apparatus located between said loops for balancing out the currents due to static disturbances while retaining the signals.

In testimony whereof we have signed this specification in the presence of two subscribing witnesses.

ROY ALEXANDER WEAGANT.
FRANK N. WATERMAN.

Witnesses:
HERBERT G. OGDEN,
M. H. PAYNE.